United States Patent
Schuler et al.

(10) Patent No.: US 6,308,589 B1
(45) Date of Patent: Oct. 30, 2001

(54) LOCKING DEVICE FOR VEHICLE SEATS, IN PARTICULAR MOTOR VEHICLE SEATS

(75) Inventors: Rolf Schuler, Heiligenhaus; Joachim Flick, Huckeswagen; Wolfgang Henrich, Schweisweiler; Christoph Leibeling, Siegburg, all of (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

(21) Appl. No.: 09/445,399
(22) PCT Filed: Aug. 6, 1998
(86) PCT No.: PCT/EP98/04908
§ 371 Date: Dec. 7, 1999
§ 102(e) Date: Dec. 7, 1999
(87) PCT Pub. No.: WO99/08892
PCT Pub. Date: Feb. 25, 1999

(30) Foreign Application Priority Data

Aug. 13, 1997 (DE) .............................. 197 35 030

(51) Int. Cl.[7] .................................................. G05G 5/06
(52) U.S. Cl. ............................................ 74/538; 248/429
(58) Field of Search .............................. 74/527, 537, 538; 248/424, 429

(56) References Cited

U.S. PATENT DOCUMENTS

| | | | |
|---|---|---|---|
| 5,560,262 | * 10/1996 | Orzech | 74/527 |
| 5,564,315 | * 10/1996 | Schuler et al. | 74/527 |
| 5,596,910 | * 1/1997 | Bauer et al. | 248/429 |
| 5,816,110 | * 10/1998 | Schuler et al. | 74/527 |
| 5,913,947 | * 6/1999 | Croche | 74/527 |
| 6,126,133 | * 10/2000 | Timon et al. | 248/429 |

FOREIGN PATENT DOCUMENTS

| | | |
|---|---|---|
| 4242895C1 | 11/1993 | (DE) . |
| 4432861A1 | 3/1996 | (DE) . |
| 0786371A2 | 7/1997 | (EP) . |
| 95/17317 | 6/1995 | (WO) . |

* cited by examiner

*Primary Examiner*—David A. Bucci
*Assistant Examiner*—Chong H. Kim
(74) *Attorney, Agent, or Firm*—Roylance, Abrams, Berdo & Goodman, L.L.P.

(57) ABSTRACT

A locking device for vehicle seats, in particular motor vehicle seats, includes two mutually displaceable parts. A rail, associated to one of the parts, extends in the direction of displacement and has at least one row of snap-in holes extending longitudinally along the rail. These holes are separated from each other by web-like material sections. Ratchets, associated to the other part, can move in relation to the rail between a disengaging position and a locking position. They move perpendicularly to the direction of extension of the rail, and are controlled via an operating mechanism. When the mutually displaceable parts are in locked position, at least one of the ratchets engages in a corresponding snap-in hole. At least one retaining element prevents involuntary disengaging of the ratchet from an effective locking position. As a result, reliable locking is achieved, in particular in the event of a crash, which entails high frequency vibrational fractions.

12 Claims, 10 Drawing Sheets

LOCKING DEVICE FOR VEHICLE SEATS, IN PARTICULAR MOTOR VEHICLE SEATS

FIELD OF THE INVENTION

The present invention relates to a locking arrangement for vehicle seats, particularly for motor-powered vehicle seats, having two parts which are displaceable relative to one another. A rail is associated with one of the parts. The rail extends in the direction of displacement and has at least one row of snap-in holes extending in rail longitudinal alignment. The holes are separated from one another by web-like material sections. Ratchets, associated with the other part, can be controlled in their movement relative to and transverse to the direction of the extension of the rail between a disengaging position and a locking position, and can be controlled by means of an operating mechanism. When in locking position, at least one of the parts displaceable relative to one another engages in an associated snap-in hole.

BACKGROUND OF THE INVENTION

A locking arrangement for vehicle seats is disclosed in PCT-WO 95/17317. With that locking arrangement, it is possible to displace two displaceable parts of the vehicle seat relative to one another continuously. A basically reliable locking is realized, even in the case of increased stress load.

In that locking arrangement, the ratchets have a wedge shape, as required by the obliquely arranged engagement surfaces. The inclined surfaces are pointed downward in an alignment transverse to the displacement alignment. A load in the direction of displacement, when the occasion arises consequently, has such low force components on the ratchets for producing a release of the locking that as a result generally no involuntary unlocking can occur. With a considerable unfavorable introduction of force, as, for example, can occur in the case of a crash with high frequency vibrational fractions, the ratchet in turn is raised out of its locked position, and thus, can be subject to a partial longitudinal thrust, lasting until the next ratchet can take over the load.

EP-A-0 786 37 discloses an arrangement for manual longitudinal adjustment of a vehicle seat. It includes a guide frame, a locking member displaceable vertically therein and a pivotal locking lever within an opening in the locking member. The locking member is provided at the bottom with a cog arrangement projecting downward through an opening in the guide frame and engaging with a corresponding cog arrangement. The guide frame is fastened to a top rail and serves as stop for two springs which act upon the locking member or the locking lever on the locking position. With this arrangement, it is possible only to bring ratchets in the sense of strips of cogs in or out of engagement with one another for the execution of a locking or unlocking setting. In the case of high frequency vibration fractions in the case of a crash, there exists the possibility of the breakdown of the locking.

SUMMARY OF THE INVENTION

Objects of the present invention are to provide an improved locking arrangement that prevents an undesired removal from engagement of the relevant locking ratchet by lifting it out of an effective locking position, especially in the case of a crash, leading to high frequency vibration fractions.

The foregoing objects are basically provided by a locking arrangement for vehicle seats having two relatively displaceable seat parts, comprising a rail associated with one seat part having a longitudinal axis extending in a displacement direction and having at least one row of snap-in openings arranged along the longitudinal axis. The snap-in openings are separated from one another by web-like material sections. Ratchets associated with the other seat part are displaceable transverse to the longitudinal axis relative to the rail between disengaging positions and locking positions in the snap-in openings. An operator is coupled to the ratchets for controlling movement of the ratchets between the disengaging positions and the locking positions. At least one retaining element is coupleable to each of the ratchets for preventing undesired disengagement of the respective ratchet from the locking position thereof.

The retaining prevents undesired removal from engagement of the relevant ratchet by lifting it out of an effective locking position. Effective locking is reliably in place even in case of a crash with high frequency vibration fractions, since the ratchets in the case of even minimal lifting up movement out of their locking position are either held tightly in an effective locking position or are subject to an additional retaining force in the direction of this locking position by spring latches or catching hooks.

Preferably, the relevant retaining element is formed of a sort of catch device, which works force-locking and/or form-locking on the associated ratchet.

With one especially preferred embodiment of the locking arrangement according to the present invention, the catch device is formed of a pair of spring latches which limit an engagement opening for the ratchet and which are arranged with their free spring ends in position for contact with the ratchet. On the basis of this arrangement, with minimal lifting displacement of the ratchet in the area of a still effective locking position, a counterforce is carried out by the adjustment force of the spring latches such that lifting up is prevented.

In another preferred type of embodiment, the catch device is formed of a catching hook which can be moved by the dovetail tenon part of the operating mechanism and controlled by a compression spring between a detached or disengaging position and a locking position. In the locking position, the ratchet is blocked in a reliably effective locking position. A form-locking connection is instituted, with especially high retaining forces which can be executed on the locking ratchet in the objective of a blocking and providing a still effective locking position.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
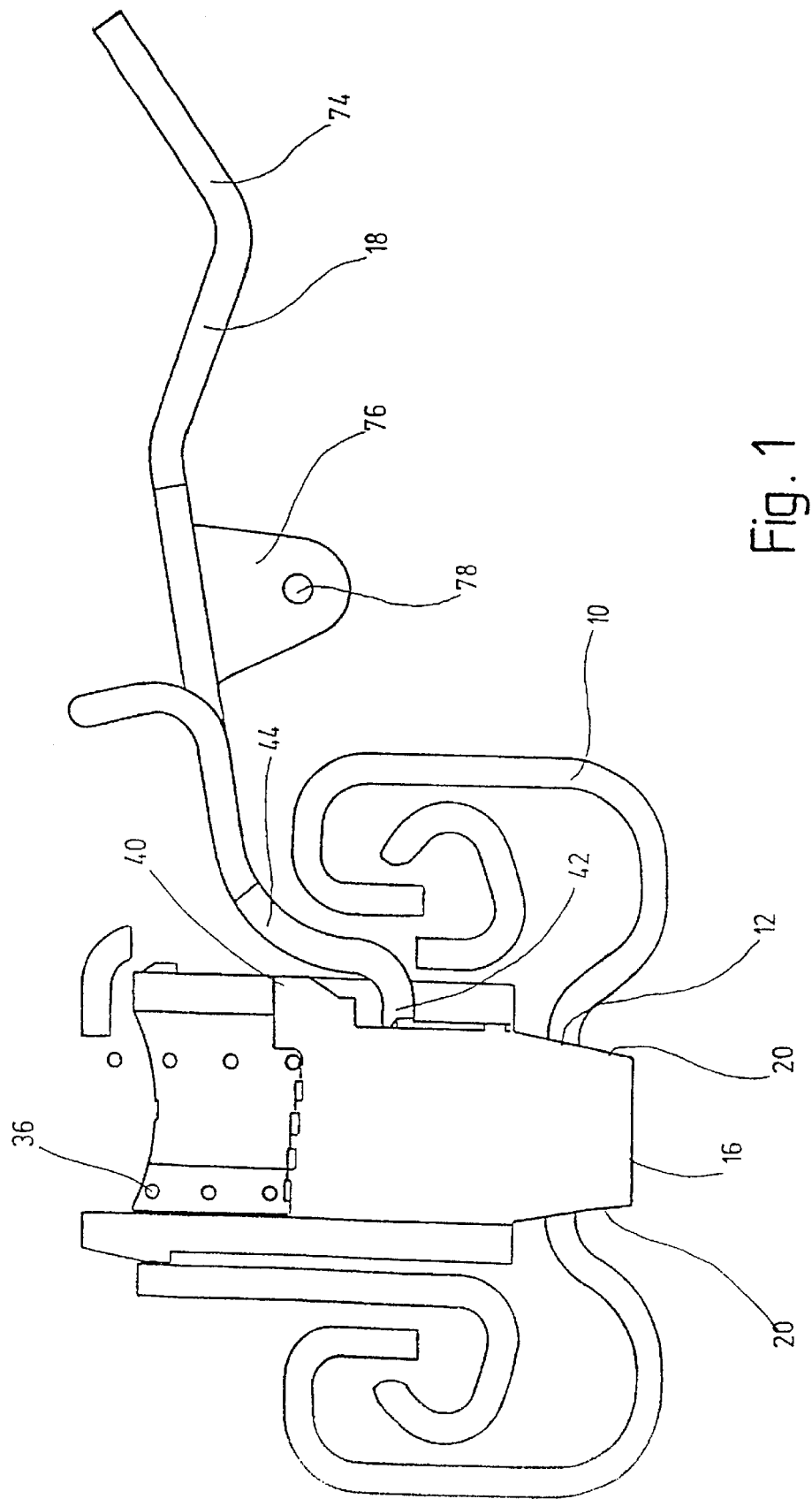
FIG. 1 is a front elevational view of a locking arrangement according to a first embodiment of the present invention.
Figure 2:
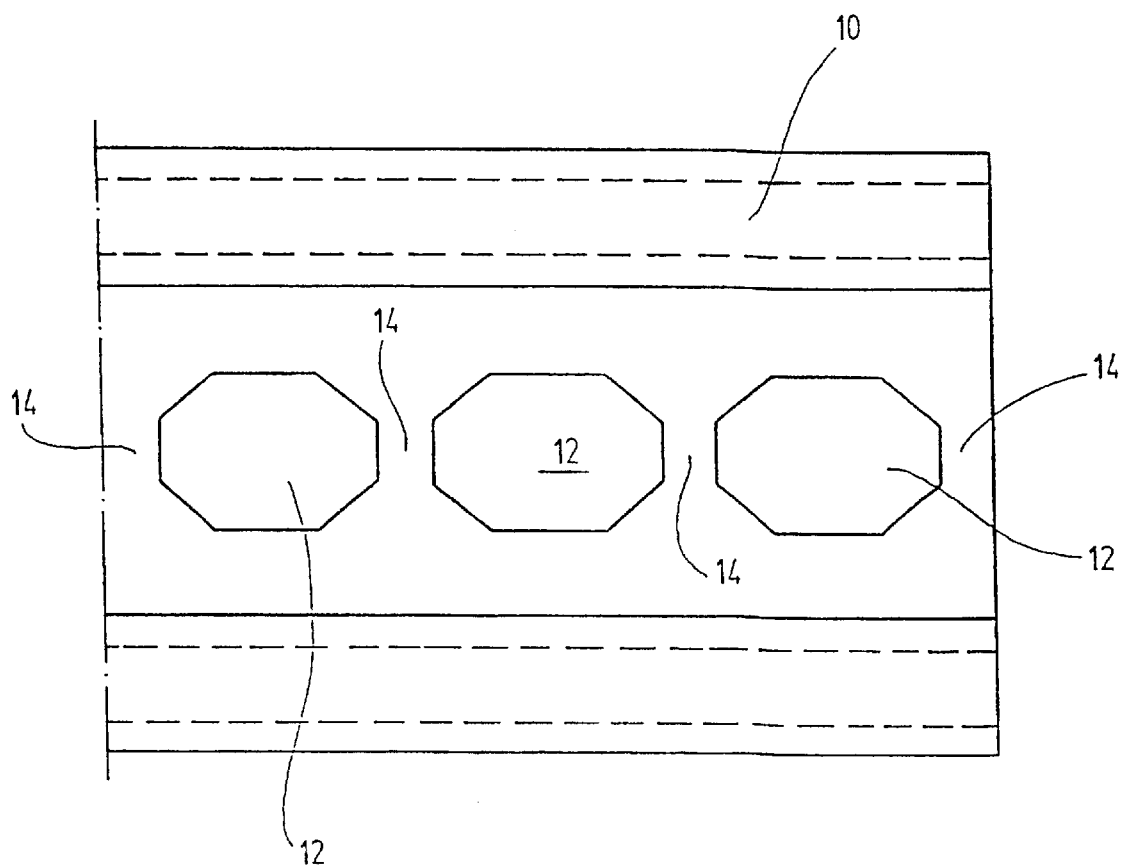
FIG. 2 is a top plan view of a section of the rail of the locking arrangement of FIG. 1.

FIG. 1 shows the locking arrangement of the present invention for vehicle seats, especially for motor-powered vehicle seats. The locking arrangement has two movable parts which are displaceable to one another. A rail 10 is associated with the one part and extends in the alignment of displaceability. The rail has a row of snap-in holes 12 (see FIG. 2) extending in rail longitudinal alignment or axis and separated from one another by web-like material sections 14. Ratchets 16 are associated with the other rail-like part of identical configuration, and can be controlled for movement transverse to the direction of extension of rail 10. The ratchets are displaced relative to that rail between a disengaging position and a locking position, and are also controllable by means of an operating mechanism 18. At least two of the parts displaceable relative to one another in the locking position engage, as shown in FIG. 1, in a snap-in opening 12, which is located on the locking position of the locking arrangement. For engagement with the associated snap-in hole 12, ratchets 16 have engagement surfaces 20, which because they are oblique form a wedge shape for the relevant ratchet 16.

Figure 8:
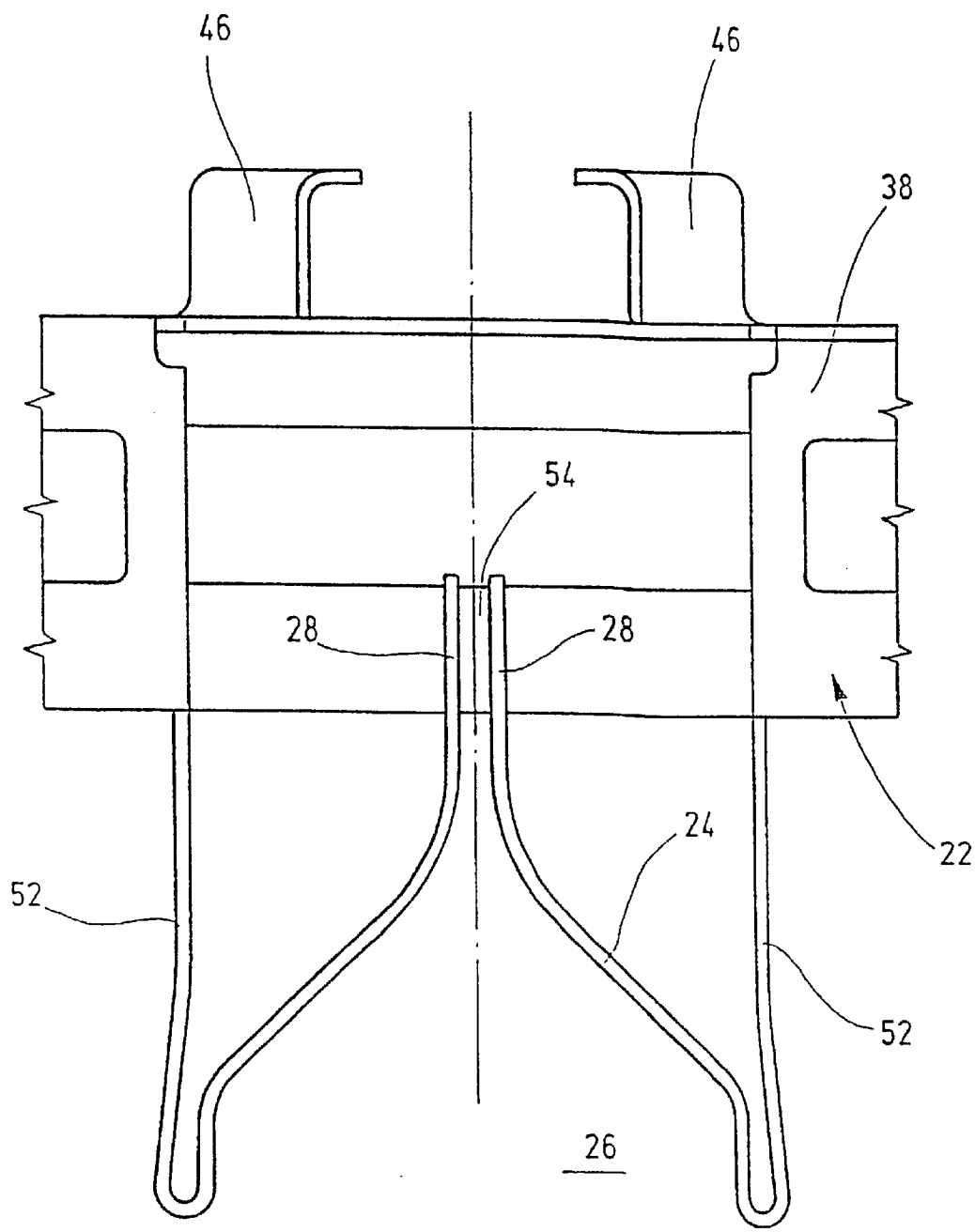
FIG. 8 is a side elevational view of the retaining element of the locking arrangement of FIGS. 3–5.

The locking arrangement also includes retaining elements which prevent the execution of undesired removal of engagement of the relevant ratchet 16 from an effective locking position. The retaining element in this case is formed of a catch device 22 (FIGS. 3, 8, 9), which executes the force- and/or form-locking on the associated ratchet 16. According to the first embodiment of the locking arrangement to be described, catch device 22 is formed of a pair of spring latches 24 (FIG. 8). Spring latches 24 limit an engagement opening 26 for ratchet 16 and are embodied with their free spring ends arranged for contact with the ratchet. In the case of high stress loads, especially in the case of a crash with high frequency vibration fractions, when a displacement of ratchet 16 is generated in the direction of its disengaging position, a counterforce is exerted on the ratchet. The counterforce is in the direction of its effective locking position.

Figure 9B:
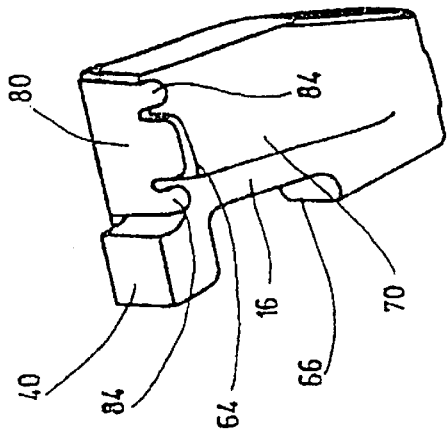
FIGS. 9a–d are perspective, perspective, front and side elevational views, respectively, of a retaining element according to a second embodiment of the present invention.
Figure 9D:
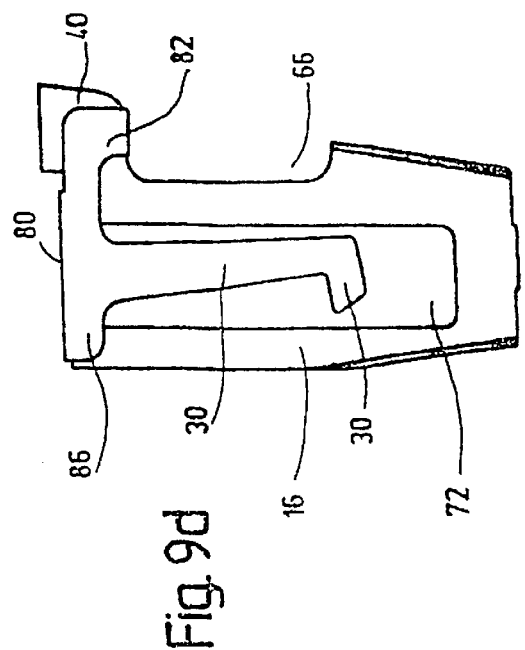
Figure 9A:
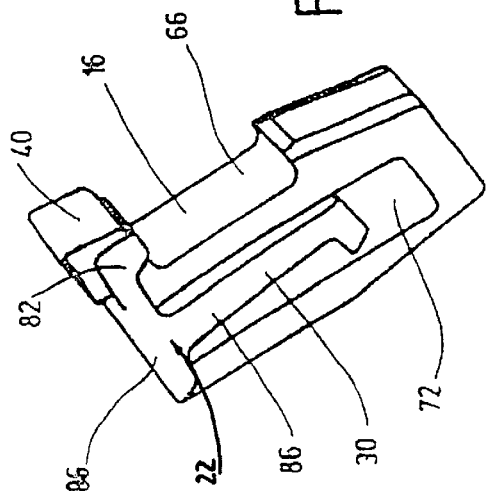

In another embodiment of the locking arrangement according to the illustration shown in FIGS. 9a and 9d, each catch element 22 is formed of a catching hook 30 which can be displaced between a release or disengaging position and a locking or engaged position. Displacement is controlled by the dovetail tenon part of the operating mechanism and a compression spring, in which ratchet 16 is blocked in a still effective locking position. The blocking can be released without further problem as explained in greater detail hereinafter.

Figure 7:
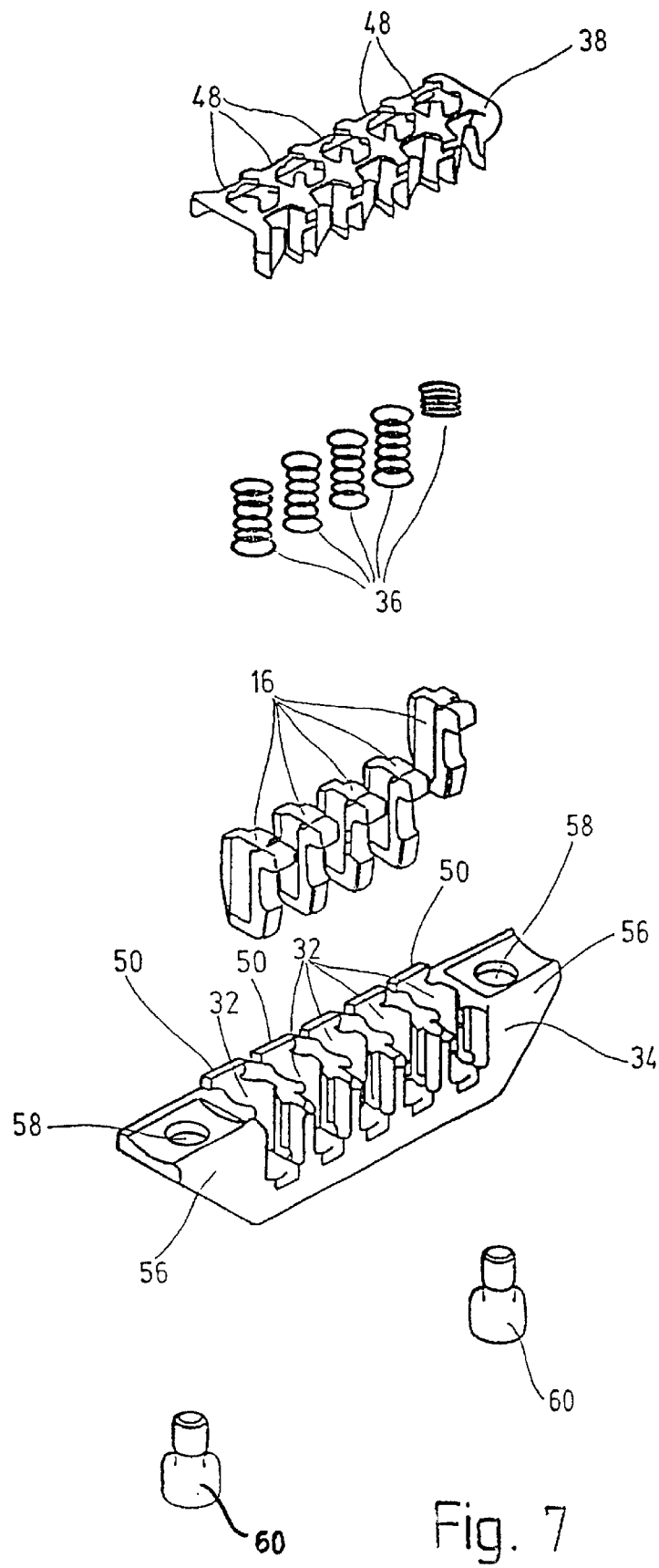
FIG. 7 is an exploded perspective view of the locking arrangement of FIGS. 3 to 5.

Individual ratchets 16 are guided with axial spacing from one another in guides 32 of housing 34 (FIG. 7). Guides 32 extend transverse to the rail longitudinal alignment or axis. Ratchets 16 are held by means of a biased spring in the form of a compressing sprig 36 in the alignment of locking positions. Compressing spring 36 is supported with one end on the sheet metal cover 38 of housing 34 and with its other end on ratchet 16 or on parts of catch device 22 according to the representation as in FIGS. 9a–d. As shown especially in FIGS. 7 and 8, the pair of spring latches 24 is part of sheet metal cover 38 and connected as one integral piece with this cover. For control of ratchets 16, on their side turned toward operating mechanism 18 (FIG. 1), these ratchets in turn have a control cam 40 controlled by the projecting dovetail tenon part 42 of a control rod 44 of operating mechanism 18.

Figure 4:
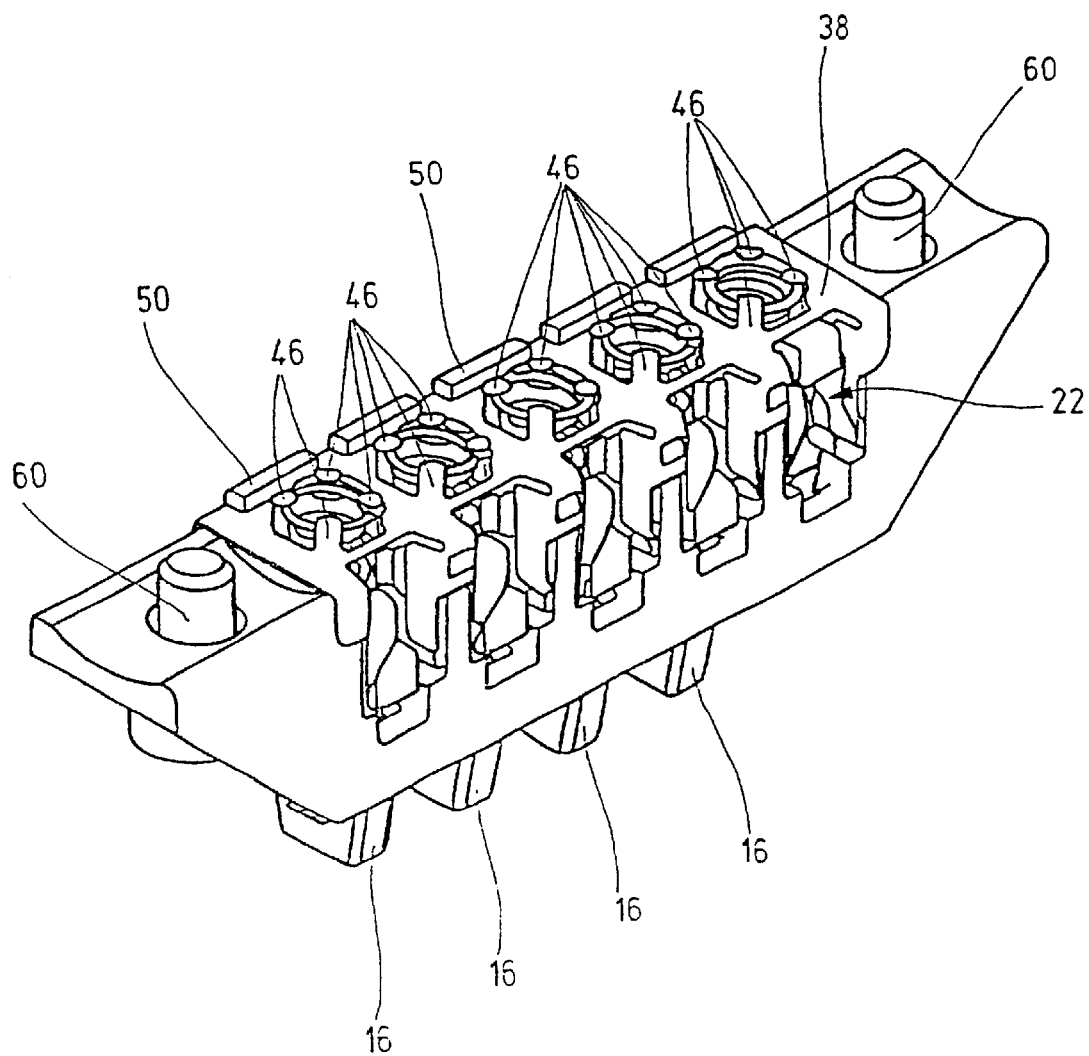
Figure 5:
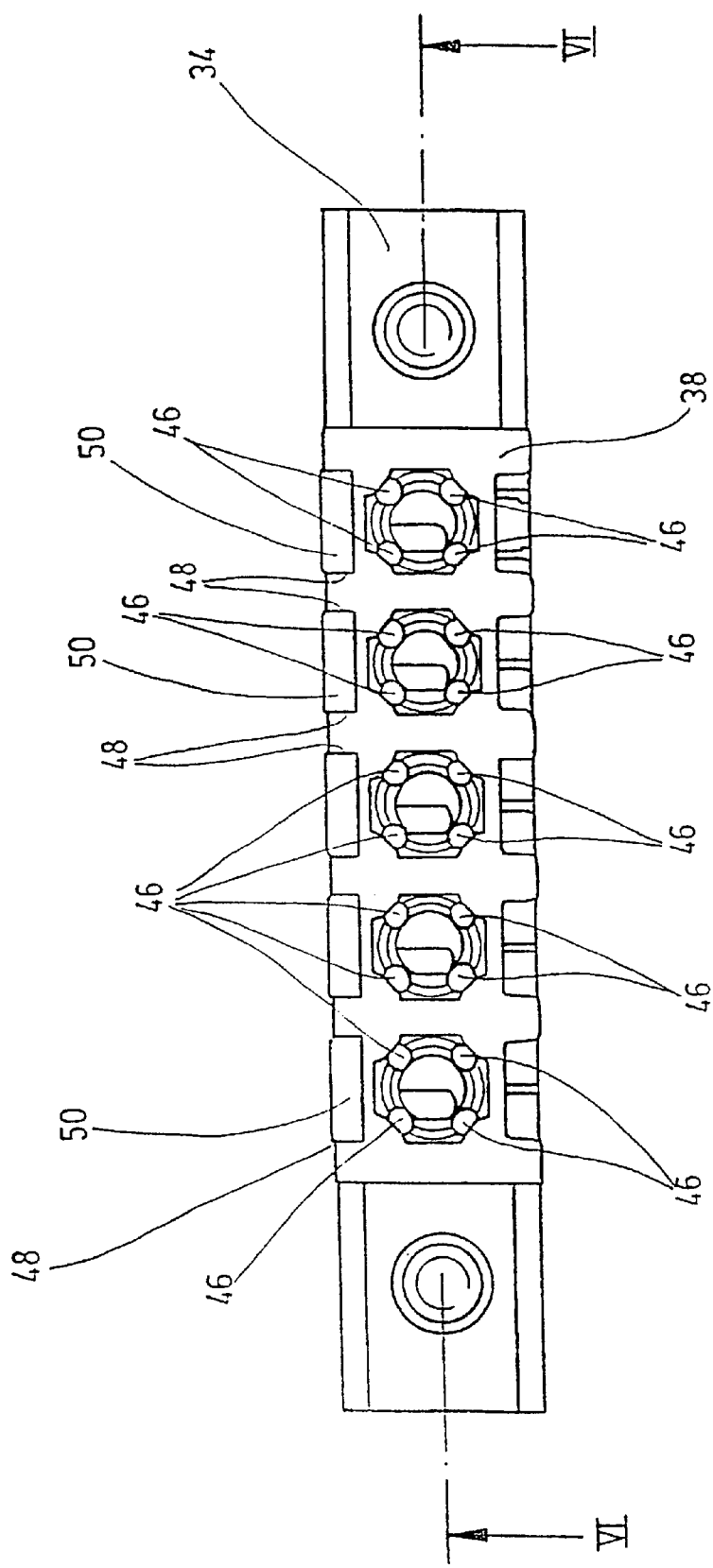

Sheet metal cover 38 can be manufactured by cutting out or stamping out a flat section of sheet metal. The exterior contour of sheet metal cover 38 can be executed by corresponding bending and rolling. On its side facing ratchets 16, sheet metal cover 38 has retaining hooks 46 (FIG. 4) in pairs diametrically facing one another. Their hook-shaped projections construct a contact surface for the one free end of the relevant compression spring 36. Sheet metal cover 38, on its side opposite the pairs of spring latches 24, has notches 48 (FIG. 7) which serve for the penetration of stationary housing part webs 50. This construction simplifies the tightening down of sheet metal cover 38 on the housing 34 associated with it.

One-piece latch-like projections 52 are fastened to the bottom of the essentially U-shaped sheet metal cover 38. The projections 52 are of identical lengths, are bent toward one another in pairs, as is shown particularly in FIG. 8, and limit the engagement openings 26 for control cams 40 of a ratchet 16. They are simply bent or curved inward in the same sense as retaining hooks 46. Spring ends 28 of a pair of spring latches 24 can thus, when not in operational state, engaged force-locking on one another or, as shown in FIG. 8, with tapering of engagement opening 26, can limit a penetration gap 54.

Figure 6:
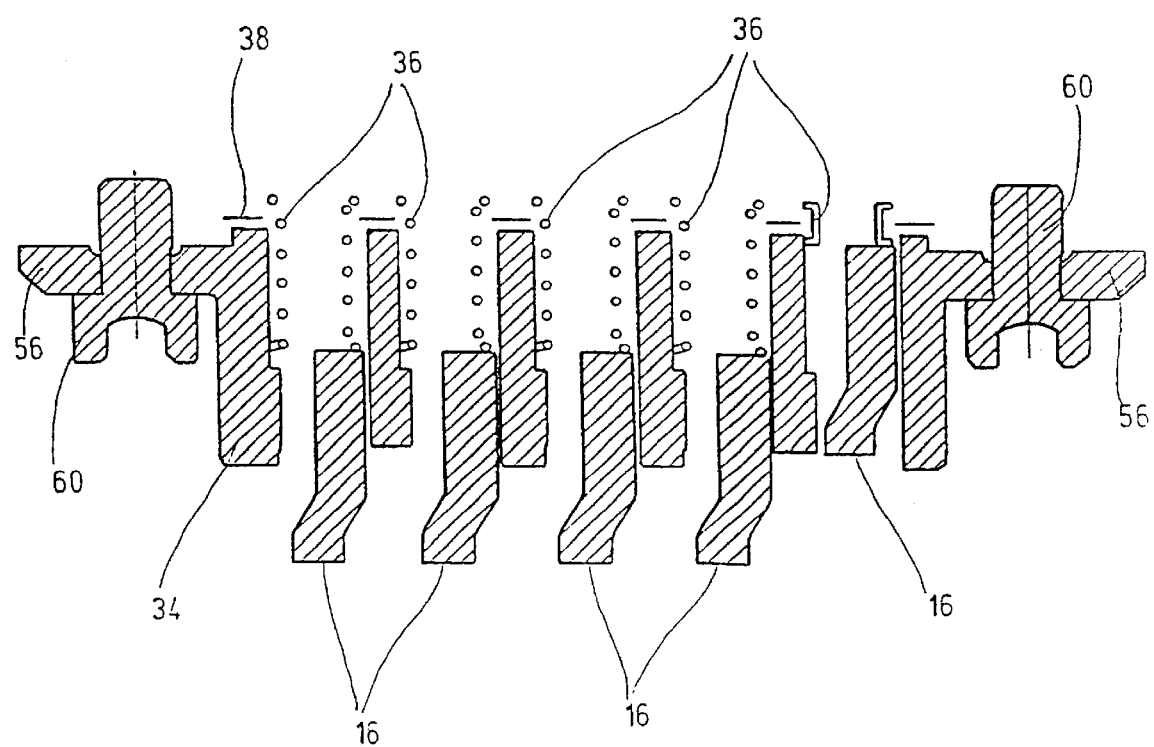
FIG. 6 is a side elevational view in section taken along line VI—VI of FIG. 5.

In the representations shown in the drawings, all ratchets 16 are found in their locking position locking the rail 10, except for ratchet 16 furthest to the right when viewing the drawings, which is shown in its unlocking, disengaging position. On its top, housing 34 is mounted essentially flush with sheet metal cover 38 mounted along its midline. Housing 34 seen in its longitudinal alignment, in other words in the alignment of the free ends of ratchets 16, has conically tapering side parts 56 tapering downward (FIG. 6). Side parts 56 are provided with boreholes 58 for the penetration of two screws 60 tightening the mounting of housing 34 on the slide rail.

The details of the construction of the individual ratchets 16 can be seen especially from the representation of FIGS. 9a–d. The contact surfaces 20 of the relevant ratchet 16 are arranged opposite one another. At their free lower ends, they limit a flat closing-off surface 62. Opposite this closing-off surface 62, ratchet 16 has a contact surface 64. In the first embodiment and contrary that that shown in FIGS. 9a–d, contact surface 64 extends parallel and in that same direction and in alignment with closing-off surface 62. Control cam 40 is attached in the extension of contact surface 64 and engages therewith at least on one side. Control cam 40 and the engagement surface 20 associated therewith define a U-shaped contact space 66 therebetween. With ratchets 16 inserted in housing 34, space 66 is penetrated by a transverse web surface 68 (FIGS. 3 and 10) of housing 34 extending in rail longitudinal alignment.

Figure 3:
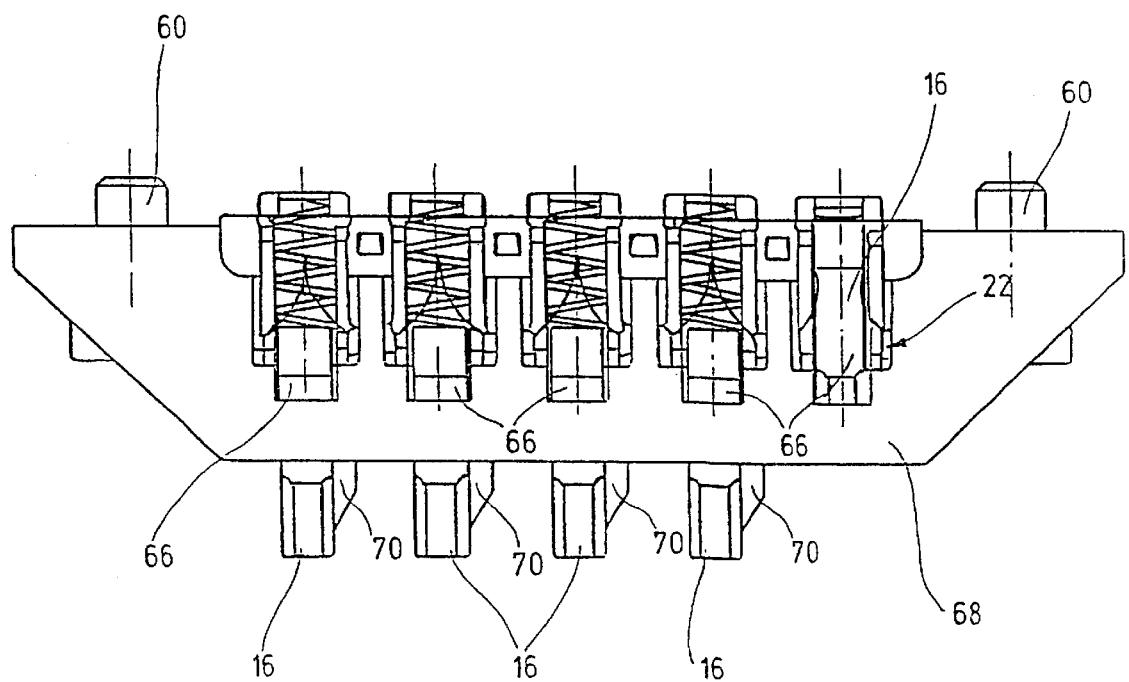
FIGS. 3, 4, 5 are side elevational, perspective and top plan views, respectively, of the locking arrangement of FIG. 1.

As further support in the guiding for the displacement of the relevant ratchet 16 in housing 34, this housing has an auxiliary web surface 70 (FIG. 3). Web surface 70 at least partially leads to the point provided for a widening of ratchet 16, and provides guide surfaces for the engagement in the associated guide notch openings within housing 34, which notch openings form web-like, widened-out notches within guides 32. The relevant auxiliary web surface 70 of each ratchet 16 can also be manufactured as a sort of an embossing, so that a corresponding channel guide 72 is produced opposite, and extends within ratchet 16.

As is shown especially in FIG. 3 and in connection with FIG. 1, between control cams 40 and the associated top of transverse web surface 68 of housing 34, a recessed space extends in which the associated dovetail tenon part 42 of operating mechanism 18 can engage. If articulated rod 74 is controlled manually or by a corresponding drive, pivoting it around the fastened-on axle guide 76 and consequently around rotary axis 78, the relevant dovetail tenon part 42 lifts the associated ratchet 16 on control cam 40. This ratchet is then displaced counter to the spring bias of compressing spring 36 into its disengaging position and consequently into alignment with the interior of housing 34. If articulated rod 74 is left free, compression springs 36 assist with the corresponding retaining movement holding the ratchet in the original position and consequently with the overall arrangement in the locking position. In the locking position, the engagement surfaces 20 of ratchets 16 project downward out of housing 34, and can engage in the associated snap-in holes or openings 12 of rail 10. With corresponding guiding, the ratchets can undertake the locking without any play.

In the described displacement of ratchets 16 counter to the force of compression springs 36, control cams 40 are moved through engagement openings 26 of associated spring latch pairs 24. The continued movement of control cam 40 causes it to come in contact with spring ends 28 and forces these spring ends apart while remaining in axial alignment. Penetration gap 54 is widened, and the two spring ends 28 then press force-locking on control cam 40. If the aforementioned operating mechanism 18 is constructed of a plurality of parts or is multi-sectional, and for example has individually controllable dovetail tenon parts controlling the relevant control cam 40, individual control of ratchets 16 can also be attained.

In another embodiment of the locking arrangement of the present invention, as shown in FIGS. 9a to 9d, spring latch pairs 24 as retaining element as well as catch device 22 can be deleted. Moreover, in this case, catch device 22 made up of a catching hook 30 can be moved into a locking position by dovetail tenon part 42 of the operating mechanism and a compressing spring 36 controlled between a released position, as it is shown in FIGS. 9a–d, into a locking position. While in the locking position, ratchet 16 is blocked in a still effective locking position. For this purpose, the relevant ratchet 16 includes the aforementioned channel guide 72 receiving catching hook 30. By means of a base plate 80, hook 30 cooperates with a control hook 82 (FIG. 10), which moves catching hook 30 in the described manner controlled by dovetail tenon part 42 of operating mechanism 18 and a compression spring 36.

An inclined contact surface 64 is required in this case for contacting base plate 80 with ratchet 16. They meet together in an imaginary extension with the horizontally arranged closing-off surface 62 likewise in an imaginary extension in a cross sectional line. Base plate 80 can include projections 84 for the incorporation or enveloping of contact surface 64. On the opposite side, base plate 80 is arranged in a deflection or reorientation set off at 90° in a flat articulating plate 86. Catching hook 30 as well as control hook 82 are shaped in turn out of articulating plate 86. Preferably, control hook 82 stretches over or beyond the bottom of control cam 40 and engages through engagement space 66 in that manner.

Figure 9C:
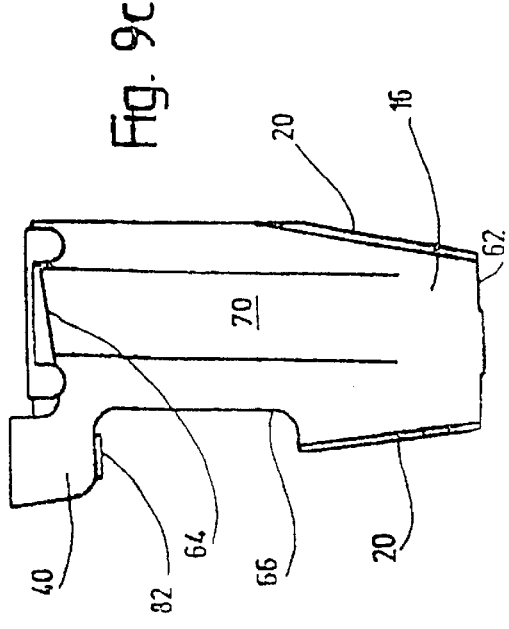

FIGS. 9c and 9d show the ratchet during the locking procedure. Dovetail tenon part 42 of operating mechanism 18 in this case presses the hooked end of control hook 82, while surmounting the spring force of compression spring 36 against control cam 40. Thus, the hook part of catching hook 30 is brought out of engagement and ratchet 16 can be raised.

Figure 10:
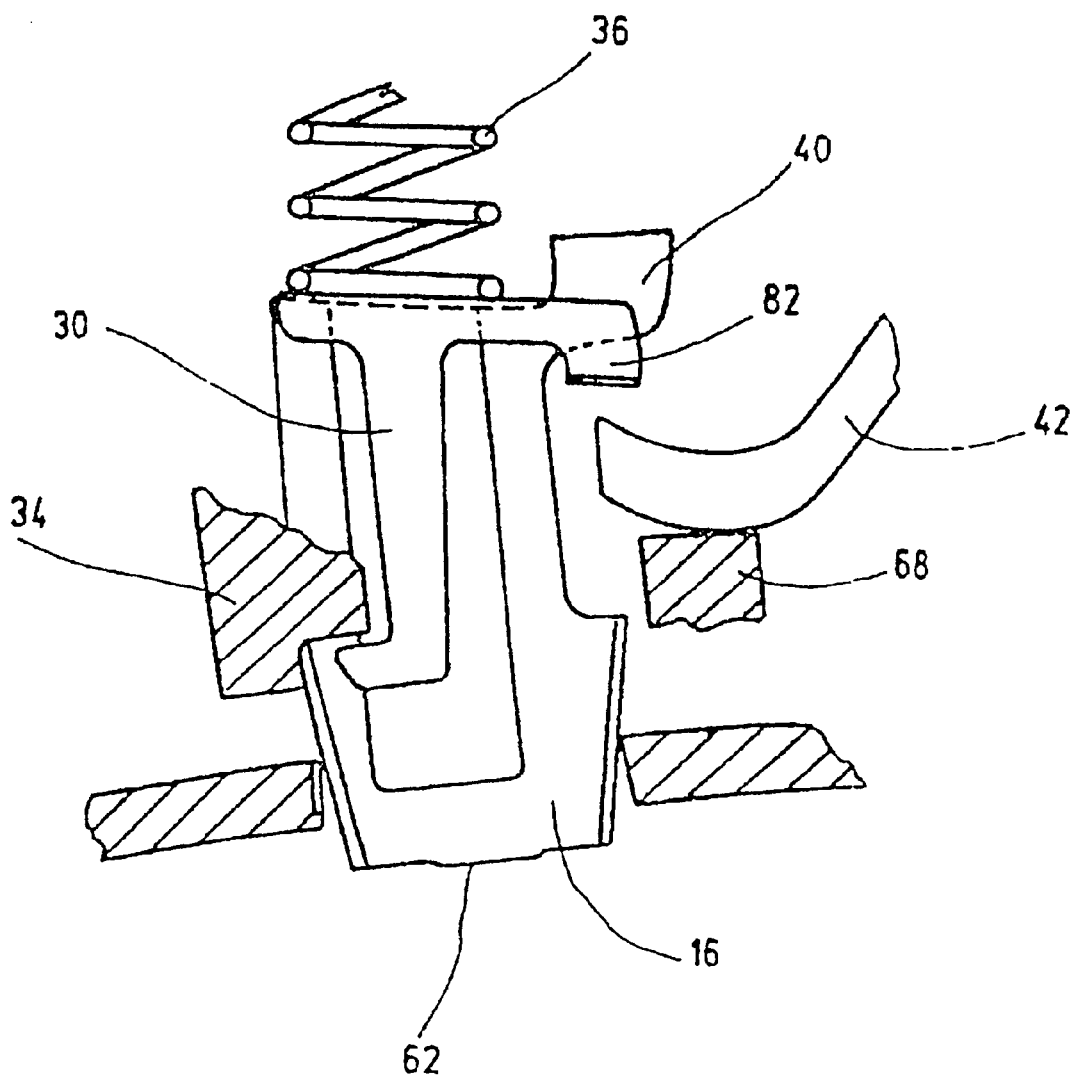
FIG. 10 is a front elevational view, partially in section, of a locking arrangement according to the second embodiment.

FIG. 10 shows a ratchet 16 with catching hook 30 in locked state. The hook of catching hook 30 is brought into locking position by compression spring 36 (base plate 80 comes into contact surface 64). When ratchet 16 now comes under extreme stress, to lift it up (under control), the hook of catching hook 30 comes into contact under a projection in the area of the housing bottom edge. Thus, ratchet 16 is then held tightly in an effective locking position.

With the catch device according to the present invention as retaining element, which causes force- and/or form-locking on the associated ratchet, consequently an undesired removal from engagement of the relevant ratchet by moving it out of an effective locking position is prevented. In good order, the catch device sustains the relevant ratchet and holds it in a still effective locking position.

A reliable locking takes place in case of a crash with high frequency vibration fractions, since the ratchets undergoing even minimal lifting up movement out of their locking position are captured. In such a manner, they can still mesh, whereby an additional holding force can be exerted simultaneously in the direction of this blocking position by means of the catch mechanism. A locking catch procedure is facilitated independent of the relevant engagement situation. As a consequence of the degree of engagement of the relevant ratchet or locking mechanism, undesired displacement of the ratchet is also prevented, when this mechanism as compared to the state of the art has not completely attained its blocking end position.

While various embodiments have been chosen to illustrate the invention, it will be understood by those skilled in the art that various changes and modifications can be made therein without departing from the scope of the invention as defined in the appended claims.

What is claimed is:

1. A locking arrangement for vehicle seats, having two, relatively displaceable seat parts, comprising:

a rail associated with one seat part having a longitudinal axis extending in a displacement direction and having at least one row of snap-in openings arranged along said longitudinal axis, said snap-in openings being separated from one another by web-like material sections;

ratchets associated with the other seat part and displaceable transverse to said longitudinal axis relative to said rail between disengaging positions and locking positions in said snap-in openings;

an operator coupled to said ratchets for controlling movement of said ratchets between said disengaging positions and said locking positions; and at least one retaining element, coupleable to each of said ratchets, for preventing undesired disengagement of the respective ratchet from the locking position thereof, each said retaining element being a catch device force locking the respective ratchet, said catch device being a pair of spring latches defining an engagement opening for the respective ratchet and having free ends for contacting the respective ratchet.

2. A locking arrangement according to claim 1 wherein a housing includes guides separated from one another along and extending transverse to said longitudinal axis, said guides receiving and guiding movement of said ratchets; and bias springs hold said ratchets in said locking positions.

3. A locking arrangement according to claim 2 wherein
said bias springs are compression springs having first ends supported on a sheet metal cover of said housing and said second ends supported on said ratchets.

4. A locking arrangement according to claim 3 wherein
each said pair of spring latches is connected integrally as one piece with said sheet metal cover.

5. A locking arrangement according to claim 1 wherein
said operator includes a control rod and a dovetail tenon part; and
each said ratchet includes a central cam engaged at least indirectly by said dovetail tenon part.

6. A locking arrangement for vehicle seats, having two, relatively displaceable seat parts, comprising:
a rail associated with one seat part having a longitudinal axis extending in a displacement direction and having at least one row of snap-in openings arranged along said longitudinal axis, said snap-in openings being separated from one another by web-like material sections;
ratchets associated with the other seat part and displaceable transverse to said longitudinal axis relative to said rail between disengaging positions and locking positions in said snap-in openings;
an operator coupled to said ratchets for controlling movement of said ratchets between said disengaging positions and said locking positions; and
at least one retaining element, coupleable to each of said ratchets, for preventing undesired disengagement of the respective ratchet from the locking position thereof, each said retaining device being a catch device force locking the respective ratchet, each said catch device being a movable catching hook controlled by a dovetail tenon part of said operator and by a compression spring to move between a release position and an engaged position retaining the respective ratchet in said locking position thereof.

7. A locking arrangement according to claim 6 wherein
a housing includes guides separated from one another along and extending transverse to said longitudinal axis, said guides receiving and guiding movement of said ratchets; and
bias springs hold said ratchets in said locking positions.

8. A locking arrangement according to claim 7 wherein
said bias springs are compression springs having first ends supported on a sheet metal cover of said housing and said second ends supported on said ratchets.

9. A locking arrangement according to claim 6 wherein
said operator includes a control rod coupled to said dovetail tenon part; and
each said ratchet includes a central cam engaged at least indirectly by said dovetail tenon part.

10. A locking arrangement for vehicle seats, having two, relatively displaceable seat parts, comprising:
a rail associated with one seat part having a longitudinal axis extending in a displacement direction and having at least one row of snap-in openings arranged along said longitudinal axis, said snap-in openings being separated from one another by web-like material sections;
ratchets associated with the other seat part and displaceable transverse to said longitudinal axis relative to said rail between disengaging positions and locking positions in said snap-in openings;
an operator coupled to said ratchets for controlling movement of said ratchets between said disengaging positions and said locking positions;
at least one retaining element, coupleable to each of said ratchets, for preventing undesired disengagement of the respective ratchet from the locking position thereof, each said retaining element being a movable catching hook in a channel guide on the respective ratchet, each said catching hook cooperates by a base plate with a control hook, each said control hook moving the respective catching book and being controlled by a dovetail tenon part of said operator;
a housing including guides spaced from one another along and extending transverse to said longitudinal axis, said guides receiving and guiding movement of said ratchets; and
bias springs holding said ratchets in said locking positions, said bias springs being compression springs having first ends supported on a sheet metal cover of said housing and second ends supported on said ratchets.

11. A locking arrangement according to claim 10 wherein
said base plate on each said ratchet includes an inclined contact surface.

12. A locking arrangement according to claim 10 wherein
each said ratchet comprises a control cam engaged at least indirectly by said dovetail tenon part.

* * * * *